(12) United States Patent
Parlos

(10) Patent No.: US 7,024,335 B1
(45) Date of Patent: Apr. 4, 2006

(54) CONDITION ASSESSMENT AND LIFE EXPECTANCY PREDICTION FOR DEVICES

(75) Inventor: Alexander G. Parlos, College Station, TX (US)

(73) Assignee: The Texas A&M University System, College Station, TX (US)

( * ) Notice: Subject to any disclaimer, the term of this patent is extended or adjusted under 35 U.S.C. 154(b) by 164 days.

(21) Appl. No.: 10/628,071

(22) Filed: Jul. 25, 2003

Related U.S. Application Data

(63) Continuation of application No. 10/298,276, filed on Nov. 15, 2002, now abandoned, which is a continuation of application No. 09/877,256, filed on Jun. 8, 2001, now abandoned, which is a continuation of application No. 09/293,536, filed on Apr. 15, 1999, now abandoned, which is a continuation of application No. 09/419,683, filed on May 8, 2000, now abandoned, which is a continuation of application No. 09/566,301, filed on May 5, 2000, now abandoned.

(60) Provisional application No. 60/081,848, filed on Apr. 15, 1998.

(51) Int. Cl.
*G06F 19/00* (2006.01)
*G05B 13/02* (2006.01)

(52) U.S. Cl. .......................... 702/182; 700/30; 700/31; 700/52

(58) Field of Classification Search ................ 702/182, 702/183, 184, 185; 700/30, 31, 47, 48, 50, 700/52; 706/903, 906, 907, 914, 915
See application file for complete search history.

(56) References Cited

U.S. PATENT DOCUMENTS

| | | | | |
|---|---|---|---|---|
| 5,210,704 | A | * 5/1993 | Husseiny | 702/34 |
| 5,408,406 | A | * 4/1995 | Mathur et al. | 700/45 |
| 5,479,571 | A | 12/1995 | Parlos et al. | 706/25 |

(Continued)

OTHER PUBLICATIONS

Parlos et al., "Neuro–Predictive Process Control Using On–Line Controller Adaptation", IEEE, Sep. 2001.*
Parlos et al., "Neuro–Predictive Process Control Using On–Line Controller Adaptation", IEEE, Jun. 2000.*
Patton et al., "Fault Diagnosis in Nonlinear Dynamic Systems Via Neural Networks", IEEE, Mar. 21–24, 1994.*
Maruyama et al., "Detecting Faults in Nonlinear Dynamic Systems Using Static Neuro–Fuzzy Models", IEEE, Apr. 24, 1995.*
Dexter et al., "Model–Based Fault Diagnosis Using Fuzzy Matching", IEEE, Sep. 1997.*
Ayoubi et al., "Identification and Supervision of a Thermal Plant Based on Multi–Layer Perceptron Networks with Locally Distributed Dynamics", IEEE, Dec. 13–15, 1995.*
Patton et al., "Artificial Intelligence Approaches to Fault Diagnosis", IEEE, Apr. 22–23, 1999.*
Patton et al., "Artificial Intelligence Approaches to Fault Diagnosis", IEEE, Oct. 23, 1998.*
Koppen–Seliger et al., "Fault Detection and Isolation in Technical Processes with Neural Networks", IEEE, Dec., 1995.*
Marcu et al., "A Neural Network Approach to Robust Model–Based Diagnosis of Faults in a Three–Tank System", IEEE, Sep. 15–18, 1996.*

(Continued)

*Primary Examiner*—Patrick J. Assouad
(74) *Attorney, Agent, or Firm*—Baker Botts L.L.P.

(57) ABSTRACT

Assessing the condition of a device includes receiving signals from a sensor that makes electrical measurements of the device. An expected response of the device is estimated in accordance with the received signals, and a measured response of the device is established in accordance with the received signals. An output residual is calculated according to the expected response and the measured response. The condition of the device is assessed by identifying a fault of the device in accordance with the output residual.

38 Claims, 2 Drawing Sheets

U.S. PATENT DOCUMENTS

| | | | | | |
|---|---|---|---|---|---|
| 5,566,092 | A | * | 10/1996 | Wang et al. | 702/185 |
| 5,602,761 | A | * | 2/1997 | Spoerre et al. | 702/179 |
| 5,642,296 | A | * | 6/1997 | Saxena | 702/84 |
| 5,740,033 | A | * | 4/1998 | Wassick et al. | 700/29 |
| 5,877,954 | A | * | 3/1999 | Klimasauskas et al. | 700/29 |
| 5,901,059 | A | * | 5/1999 | Tao et al. | 700/29 |
| 6,014,598 | A | * | 1/2000 | Duyar et al. | 701/29 |
| 6,016,465 | A | * | 1/2000 | Kelly | 702/116 |
| 6,056,781 | A | * | 5/2000 | Wassick et al. | 703/12 |
| 6,064,916 | A | * | 5/2000 | Yoon | 700/44 |
| 6,110,214 | A | * | 8/2000 | Klimasauskas | 703/2 |
| 6,199,018 | B1 | * | 3/2001 | Quist et al. | 702/34 |
| 6,208,949 | B1 | * | 3/2001 | Eatwell | 702/189 |
| 6,223,544 | B1 | * | 5/2001 | Seem | 62/127 |
| 6,246,972 | B1 | * | 6/2001 | Klimasauskas | 703/2 |
| 6,356,857 | B1 | * | 3/2002 | Qin et al. | 702/185 |
| 6,363,289 | B1 | * | 3/2002 | Keeler et al. | 700/48 |
| 6,393,373 | B1 | * | 5/2002 | Duyar et al. | 702/115 |
| 6,590,362 | B1 | * | 7/2003 | Parlos et al. | 318/799 |
| 6,713,978 | B1 | * | 3/2004 | Parlos et al. | 318/268 |

OTHER PUBLICATIONS

Chowdhury et al., "A Modular Methodology for Fast Fault Detection and Classification in Power Systems", IEEE, Sep. 1998.*

Parlos et al., "An Algorithmic Approach to Adaptive State Filtering Using Recurrent Neural Networks", IEEE, Nov. 2001.*

Parlos et al., "Multi–Step–Ahead Prediction Using Dynamic Recurrent Neural Networks", IEEE, Jul. 1999.*

Schenker et al., "Predictive Control of a Bench–Scale Chemical Reactor Based on Neural–Network Models", IEEE, May 1998.*

Schneider et al., "Observer–Based Supervision and Fault Detection in Robots Using Nonlinear and Fuzzy Logic Residual Evaluation", IEEE, May 1996.*

Filippetti et al., "AI Techniques in Induction Machines Diagnosis Including the Speed Ripple Effect", IEEE, Jan./Feb. 1998.*

Sauter et al., "Fault Diagnosis in Systems Using Fuzzy Logic", IEEE, Aug., 1994.*

Isermann, "Model Based Fault Detection and Diagnosis Methods", IEEE, Jun. 1995.*

Isermann, "On Fuzzy Logic Applications for Automatic Control, Supervision, and Fault Diagnosis", IEEE, Mar. 1998.*

Tsai, Wei K., et al.; "*An Associative Memory Knowledge Base for Diagnostic and High Level Control Functions*"; © 1990 IEEE; pp. 283–288.

Fernandez, Benito, et al.; "*Nonlinear Dynamic System Identification using Artificial Neural Networks (ANNs)*"; International Joint Conference on Neural Networks, San Diego, California; pp. II—133—II—141, Jun. 17–21, 1990.

Parlos, Alexander G., et al.; "*Artificial Neural Networks Based System Identification and Control of Nuclear Power Plant Components*"; Proceedings of the 29th Conference on Decision and Control, Honolulu, Hawaii, © 1990 IEEE; pp. 1703–1706, Dec. 1990.

Parlos, Alexander G., et al.; "*Long–Term Electric Load Forecasting Using a Dynamic Neural Network Architecture*"; IEEE/NTUA Athens Power Tech Conference: "Planning, Operation and Control of Today's Electric Power Systems", Athens, Greece; pp. 816–820, Sep. 5–8, 1993.

Parlos, Alexander G., et al.; "*Development of an Intelligent Long–Term Electric Load Forecasting System*"; © 1996 IEEE; pp. 288–292.

Chong, Kil To, et al.; "*Comparison of the Traditional and the Neural Networks Approaches in a Stochastic Nonlinear System Identification*"; Proceedings of the American Control Conference Albuquerque, New Mexico; pp. 1074–1075, Jun. 1997.

Parlos, Alexander G., et al.; "*An Algorithmic Approach to Adaptive State Filtering Using Recurrent Neural Networks*"; IEEE Transactions on Neural Networks, vol. 12, No. 6; © 2001 IEEE, pp. 1411–1432, Nov. 2001.

Rais, Omar; "*Modeling Complex Process Systems Using The Recurrent Multilayer Perceptron*"; pp. 58–309, 2000.

Menon, Sunil K.; "*Adaptive Filtering in Complex Process Systems Using Recurrent Neural Networks*"; pp. 310–646, 2000.

Oufi, Esmaeil; "*Long–Term Load Forecasting in Electric Power Industry*"; pp. 648–964, 2000.

* cited by examiner

CONDITION ASSESSMENT AND LIFE EXPECTANCY PREDICTION FOR DEVICES

RELATED APPLICATIONS

This application is a continuation of U.S. Pat. application Ser. No. 10/298,276, filed Nov. 15, 2002, now abandoned, which is a continuation of U.S. Pat. application Ser. No. 09/877,256, filed Jun. 8, 2001, now abandoned, which is a continuation of U.S. Pat. application Ser. No. 09/566,301, filed May 5, 2000, now abandoned, which is a continuation of U.S. Pat. application Ser. No. 09/419,683, filed May 8, 2000, now abandoned, which is a continuation of U.S. Pat. application Ser. No. 09/293,536, filed Apr. 15, 1999, now abandoned, which claims priority under 35 U.S.C. § 119(e) on U.S. Provisional application Ser. No. 60/081,848, filed Apr. 15, 1998.

TECHNICAL FIELD OF THE INVENTION

This invention relates generally to the field of device maintenance and more specifically to condition assessment and life expectancy prediction for devices.

BACKGROUND OF THE INVENTION

The failure of critical production devices may result in lost revenues and emergency maintenance costs. Known techniques for monitoring devices include breakdown maintenance and fixed maintenance techniques. Breakdown maintenance takes a device out of operation for servicing when the device breaks down. Taking a device out of operation, however, may be expensive and time consuming. Fixed schedule maintenance performs maintenance on a device according to a fixed schedule. Fixed schedules, however, typically do not take into account factors that affect the life expectancy of a device such as operating history, loading profiles, or operating environments, and may result in performing maintenance on a device before or after the device should be serviced. Consequently, known techniques for monitoring devices may be unsatisfactory in certain situations.

SUMMARY OF THE INVENTION

In accordance with the present invention, disadvantages and problems associated with previous techniques for monitoring devices may be reduced or eliminated.

According to one embodiment of the present invention, assessing the condition of a device includes receiving signals from a sensor that makes electrical measurements of the device. An expected response of the device is estimated in accordance with the received signals, and a measured response of the device is established in accordance with the received signals. An output residual is calculated according to the expected response and the measured response. The condition of the device is assessed by identifying a fault of the device in accordance with the output residual.

Certain embodiments of the invention may provide one or more technical advantages. A technical advantage of one embodiment may be that the condition of a device may be assessed. Assessing the condition of a device may reduce the probability of shutting down and performing maintenance on the device before the device requires servicing, and may reduce the probability of continuing to operate a device that requires servicing.

Another technical advantage of one embodiment may be that the condition of a device may be assessed by subtracting an expected response of a device from a measured response of the device. The resulting unexpected response may yield information about faults of the device. Yet another technical advantage of one embodiment may be that an electrical sensor sensing electrical signals from the device may be used to detect mechanical, electrical, and electromechanical faults of the device.

Yet another technical advantage of one embodiment may be that the life expectancy of a device may be predicted, which may provide an estimate of when a device will fail or when to replace a device. Yet another technical advantage of one embodiment may be that factors that affect the device are taken into account, which may provide for a more accurate assessment of the condition of the device and a more accurate prediction of the life expectancy of the device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
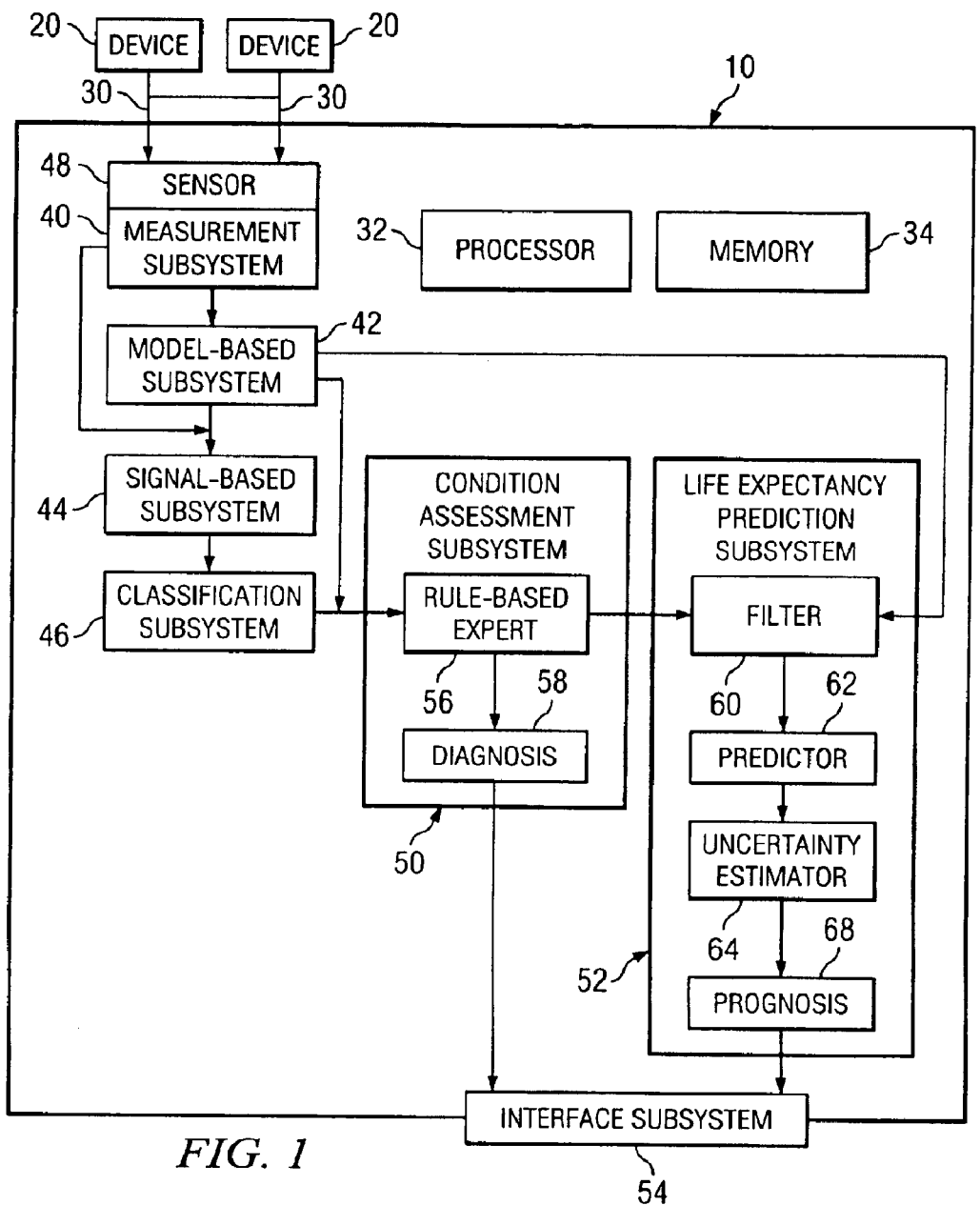
FIG. 1 is a block diagram illustrating one embodiment of a system for monitoring and assessing the health of one or more devices.

FIG. 1 is a block diagram illustrating one embodiment of a system 10 for monitoring and assessing the health of one or more devices 20. System 10 may be used to assess the condition of a device 20 and to predict the life expectancy of device 20. According to one embodiment, system 10 may use sensors operable to monitor electrical measurements of device 20 in order to detect mechanical, electrical, or electromechanical faults of device 20.

According to the illustrated embodiment, device 20 may comprise any suitable device that may have mechanical, electrical, or electromechanical faults and that provides electrical signals from which electrical measurements may be made. Examples of device 20 include electric motors, motor-driven equipment, electric generators, electric batteries, or other suitable device. Examples of electric motors include single phase and poly phase alternating current induction motors, alternating current synchronous motors, direct current motors, universal alternating current/direct current motors, permanent magnet motors, and switched reluctance motors. According to one embodiment, device 20 comprises an electric motor such as a multiphase alternating current induction motor.

Device 20 may have a fault such as a mechanical, electrical, or electromechanical fault. An electrical fault may comprise a fault that results in altering the flow of current through device 20. A mechanical fault may comprise a fault that results in altering structural or mechanical aspects of device 20.

The signals from a device 20 may comprise measured input into device 20 and corresponding measured output from device 20. The signals may represent any suitable parameter of device 20, for example, electric voltage, electric current, rotational speed, rotational acceleration, lateral acceleration, temperature, or other parameter. As an example, if device 20 comprises a multiphase alternating current induction motor, the signals may comprise measured input representing multi-phase voltages and measured output representing multi-phase currents. Electrical measurements of the signals may comprise measurement of electrical signals from device 20.

According to the illustrated embodiment, system 10 includes an interface (IF) 30, a processor 32, a memory 34, and any suitable number of subsystems 40–54 coupled as shown in FIG. 1. Interface 30 receives signals from devices 20. Processor 32 manages the operation of subsystems 40–54 of system 10, and may comprise any suitable device operable to accept input, process the input according to predefined rules, and produce output.

Memory 34 stores data and instructions used by processor 32 and subsystems 40–54, and may include Random Access Memory (RAM), Read Only Memory (ROM), magnetic drives, disk drives, Compact Disk (CD) drives, Digital Video Disk (DVD) drives, removable media storage, other suitable data storage device, or any combination of the preceding.

According to the illustrated embodiment, subsystems 40–54 may include a measurement subsystem 40, a model-based subsystem 42, a signal-based subsystem 44, a classification subsystem 46, a condition assessment subsystem 50, a life expectancy prediction subsystem 52, and an interface subsystem 54 coupled as shown in FIG. 1.

Measurement subsystem 40 monitors device 20 for signals that include measured input to and measured output from device 20, and may include a sensor 48 for monitoring device 20. Device 20 may be monitored continuously in real time or near real time without disrupting the operation of device 20 and without human intervention. Measurement subsystem 40 may also convert analog signals received from device 20 to digital signals, and may include, for example, one or more data acquisition cards. According to one embodiment, analog signals may be received from device 20 and conditioned according to analog filtering techniques to remove specific high frequency or low frequency components. The signals may be sampled to convert the analog signals to digital signals. Any suitable sampling rate may be used such as up to 100 kHz or 1 MHz. The digital signals may then be conditioned and prepared for processing by other subsystems 42–54. The digital signaling conditioning may include, for example, digital filtering or scaling.

Model-based subsystem 42 may decouple the effect of the inputs on the outputs from the effect of a disturbance on the outputs. As an example, model-based subsystem 42 may decouple the effect of motor inputs comprising three-phase voltages on the motor outputs comprising three-phase currents from the effect of disturbances, such as mechanical load, on the motor outputs. A disturbance may comprise an undesired variation in or interruption of an electrical or mechanical parameter. The decoupling may allow model-based subsystem 42 to estimate an expected response and subtract the expected response from a measured response to determine an unexpected response that may provide information about faults of device 20. The measured response may comprise the measured output of the signals received by system 10 from device 20. Model-based subsystem 42 is described in more detail with reference to FIG. 2.

Figure 2:
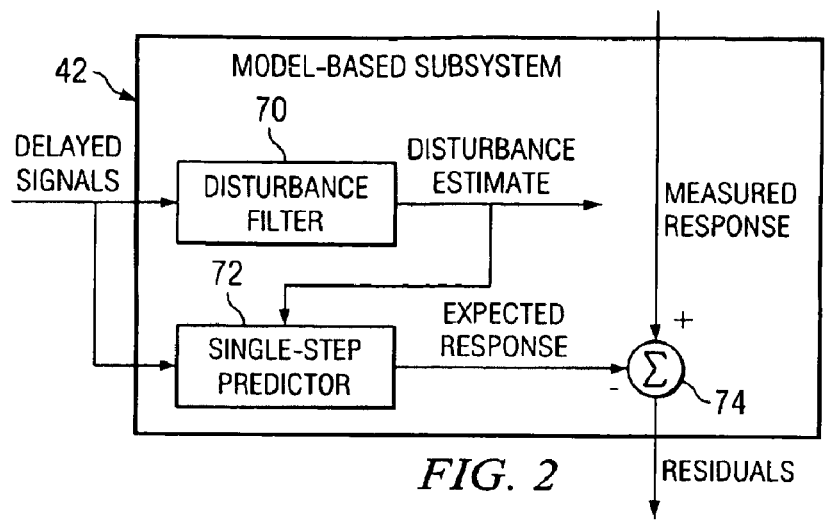
FIG. 2 is a block diagram illustrating one embodiment of a model-based subsystem of the system of FIG. 1.

FIG. 2 is a block diagram illustrating one embodiment of model-based subsystem 42 of system 10. According to the illustrated embodiment, model-based subsystem 42 includes a disturbance filter 70, a single-step predictor 72, and an adder 74. Disturbance filter 70 receives non-delayed and delayed signals and estimates a disturbance such as mechanical speed or torque in order to generate a disturbance estimate. The received signals may include past and present voltages and currents, and may also include past and present temperature, driven load controls, vibration readings, other suitable measurements, or any combination of the preceding.

Single-step predictor 72 estimates an expected response in accordance with the disturbance estimate and other delayed and non-delayed inputs and outputs. The expected response may comprise an estimated output of device 20 for given input. The expected response may be calculated according to an a priori model such as the p-q-0 model, an empirical model such as a neural network model of just-in-time maintenance technology, other model, or a combination of the preceding. Adder 74 subtracts the expected response from the measured response received from measurement subsystem 40 in order to determine an output residual. The output residual may comprise the difference between the measured response and the expected response.

Modifications, additions, or omissions may be made to model-based subsystem 42 without departing from the scope of the invention. For example, model-based subsystem 42 may have more, fewer, or other modules. Moreover, the operations of model-based subsystem 42 may be performed by more, fewer, or other modules. For example, the operations of disturbance filter 70 and single-step predictor 72 may be performed by one module, or the operations of single-step predictor 72 may be performed by more than one module. Additionally, functions may be performed using any suitable logic comprising software, hardware, other logic, or any suitable combination of the preceding.

Referring back to FIG. 1, signal-based subsystem 44 processes information received from measurement subsystem 40, model-based subsystem 42, or both subsystems. Signal-based subsystem 44 receives the output residue that may provide information about the faults of device 20, and extracts spatio-temporal features from the signals. Spatio-temporal features may comprise information from signal presented in the space and time frame of device 20, and may be extracted by transforming the signals to a time-frequency domain according to any suitable transforms such as fast Fourier transforms, windowed fast Fourier transforms, wavelets, or other suitable transforms. According to another embodiment, condition assessment subsystem 50 may extract spatio-temporal features directly from measured outputs received from classification subsystem 46.

Classification subsystem 46 assigns a fault classifier to each feature received from signal-based subsystem 44. The classification may be implemented according to any suitable procedure. As an example, classification subsystem 46 may apply a coarse feature extraction to categorize the features into a number of fault categories. A finer feature extraction may be applied to the categorized features in order to classify the faults within each fault category.

Condition assessment subsystem 50 may analyze information received from classification subsystem 46, model-based subsystem 42, or both in order to assess the condition of device 20. The condition of device 20 may comprise information about faults detected at device 20, and may describe estimates about the current status of impending failures and uncertainties associated with the estimates. The condition may also include a description of the repairs appropriate for the current status and the cost associated with the repairs, and may also include the equipment efficiency and the cost associated with the efficiency degradation.

Condition assessment subsystem 50 may include, for example, a rule based expert 56 and a diagnosis module 58. Rule-based expert 56 may analyze the fault classification received from classification subsystem 46 and the output residuals received from model-based subsystem 42 in order to determine the condition of device 20. According to one example, rule-based expert 56 may comprise a fuzzy logic expert component. Rule-based expert 56 may also provide a notification of features previously not encountered, which may indicate faults previously not encountered. Diagnosis module 58 receives the condition of device 20 from rule-based expert 56 and formats the information for appropriate display by interface subsystem 54.

Life expectancy prediction subsystem 52 predicts the expected useful life, or life expectancy, of device 20. The life expectancy may reflect an estimate of an expected time to failure and an uncertainty associated with the estimate and a predicted status of incipient failures. Life expectancy prediction subsystem 52 may analyze the operating history of device 20 and the condition assessment received from condition assessment subsystem 50 in order to predict the life expectancy of device 20. The operating history may include indicators of the expected lifetime, such as electrical power quality, motor ambient temperature, motor load torque pulsation, or other indicators. The indicators may comprise parameters operable to affect the condition or life expectancy of device 20. The cumulative effect of the indicators may be taken into account when predicting the life expectancy of device 20.

According to the illustrated embodiment, life expectancy prediction subsystem 52 includes a filter 60, a predictor 62, an uncertainty estimator 64, and a prognosis module 68. Filter 60 may comprise a filter that conditions the rate of change. Filter 60 may use non-adaptive, adaptive, or both non-adaptive and adaptive filtering of unmeasurable or unmeasured complex system state variables. Predictor 62 predicts the life expectancy in accordance with information received from filter 60. Predictor 62 may use adaptive or non-adaptive single or multistep-ahead prediction of the measured complex system output variables. Uncertainty estimator 64 calculates the uncertainty of the life expectancy. Prognosis module 68 receives information about the predicted life expectancy and uncertainty and formats the information for reporting by interface subsystem 54.

Interface subsystem 54 communicates information between a user and system 10, and may comprise, for example, a condition assessment panel and a life expectancy prediction panel. The condition assessment panel may be used to communicate the existence of or absence of a fault, the severity of a fault, the type of a fault, the progression of a fault, the speed of a fault, the urgency of a fault, or any suitable combination of the preceding.

The condition assessment panel may include, for example, a fault indicator indicating the existence of a fault, a caution indicator indicating the existence of novel features, which may indicate faults previously not encountered, a normal indicator indicating normal operation of device 20, other indicator, or any combination of the preceding. The fault type may be represented by one or more lights or other indicators, a portion or all of which may be lit or otherwise selected in order to indicate the severity of the fault.

A life expectancy prediction panel may be used to display the estimated life expectancy and the uncertainty of the estimate. The life expectancy prediction panel may be used to communicate the expected lifetime, the rate of deterioration of the expected lifetime, the uncertainty of the expected lifetime, other indicator, or any combination of the preceding. The life expectancy prediction panel may use any suitable indicators to display this information.

According to one embodiment, interface subsystem 54 may display other suitable information. As an example, interface subsystem 54 may display information regarding environmental or operating conditions that may affect the assessment of the condition or the prediction of the life expectancy such as the quality of the power supply or variations of the driven load or mechanical speed. As another example, interface subsystem 54 may display the efficiency of device 20 in the assessed condition. Recommended repairs for the assessed condition may also be displayed, along with a priority list for the recommended repairs and an estimated schedule. The cost associated with reduced equipment efficiency due to the assessed condition and the cost associated with the recommended repairs including the downtime to perform the recommended repairs may also be presented.

Interface subsystem 54 may comprise one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Interface subsystem 54 may present information in any suitable manner, for example, using audio, video, or both. Information may be presented using, for example, numbers, text, graphics, colors, sound, or any combination of the preceding. Interface subsystem 54 may include a cathode ray tube, a gauge, a liquid crystal display, a light emitting diode, a speaker, or any combination of the preceding.

Subsystems 40–54 and memory 34 may be integrated or separated according to particular needs. For example, the present invention contemplates the functions of subsystems 40–54 being provided using a single computer system, for example, a single personal computer. If subsystems 40–54 are separated, one subsystem may be coupled to another subsystem using one or more local area networks (LANs), metropolitan area networks (MANs), wide area networks (WANs), a global computer network such as the Internet, or any other appropriate wire line, wireless, or other links.

As used in this document, "each" refers to each member of a set or each member of a subset of a set. Modifications, additions, or omissions may be made to system 10 without departing from the scope of the invention. For example, system 10 may have more, fewer, or other modules. As an example, signal-based subsystem 44 may be omitted from system 10. Moreover, the operations of system 10 may be performed by more, fewer, or other modules. For example, the operation of reducing false alarms and missed faults may be performed by rule-based expert 56 instead of model-based subsystem 42.

Examples of other features that may be included in system 10 may be found in U.S. Pat. No. 5,479,571, hereby incorporated herein by reference in its entirety; U.S. Pat. application Ser. No. 10/298,276, filed Nov. 15, 2002, pending, hereby incorporated herein by reference in its entirety; which is a continuation of U.S. Pat. application Ser. No. 09/877,256, filed Jun. 8, 2001, now abandoned, hereby incorporated herein by reference in its entirety; which is a continuation of U.S. Pat. application Ser. No. 09/566,301, filed May 5, 2000, now abandoned, hereby incorporated herein by reference in its entirety; which is a continuation of U.S. Pat. application Ser. No. 09/419,683, filed Oct. 14, 1999, now abandoned, hereby incorporated herein by reference in its entirety; which is a continuation of U.S. Pat. application Ser. No. 09/293,536, filed Apr. 15, 1999, now abandoned, hereby incorporated herein by reference in its entirety; which claims priority under 35 U.S.C. § 119(e) on U.S. Provisional application Ser. No. 60/081,848, filed Apr. 15, 1998, hereby incorporated herein by reference in its entirety.

Additionally, functions may be performed using any suitable logic comprising software, hardware, other logic, or any suitable combination of the preceding. As an example, software may comprise neural network software. Neural networks may be used to learn the characteristics of device 10 by introducing feedback into a conventional feed-forward architecture.

Examples of neural networks may be found in *Neural Networks: A Comprehensive Foundation*, by S. Haykin, Prentice-Hall, Inc., 1999; *Pattern Recognition Using Neural Networks: Theory and Algorithms for Engineers and Scientists*, by C. G. Looney, Oxford University Press, 1997; or in *New Results on Recurrent Network Training: Unifying the Algorithms and Accelerating Convergence*, by A. Atiya and A. G. Parlos, IEEE Transactions on Neural Networks, Vol. 11, No. 3, pp. 697–709, May 2000.

Functions may be performed by using more traditional linear and nonlinear procedures such as linear or nonlinear least-squares procedures as presented in textbooks such as *System Identification: Theory of the User*, by L. Ljung, Prentice-Hall, Inc., 1999; *Adaptive Filter Theory*, S. Haykin, Prentice-Hall, Inc., 1996; or *Linear Estimation*, by T. Kailath, A. H. Sayed, and B. Hassibi, Prentice-Hall, Inc., 2000.

System 10 may provide certain advantages over known techniques. Known techniques for monitoring devices include breakdown maintenance and fixed maintenance techniques. Breakdown maintenance takes a device out of operation for servicing when the device breaks down. Taking a device out of operation, however, may be expensive and time consuming.

Fixed schedule maintenance performs maintenance on a device according to a fixed schedule. Fixed schedules, however, typically do not take into account factors that affect the life expectancy of a device such as operating history, loading profiles, or operating environments, and may result in performing maintenance on a device before or after the device should be serviced.

Consequently, known techniques for monitoring devices may be unsatisfactory in certain situations. Moreover, known techniques typically do not measure the long-term performance and assess the condition of a device while the device is operating. Furthermore, known techniques also do not predict equipment failure in time to allow for adequate planning of maintenance. Accordingly, system 10 may provide certain advantages over known techniques.

Figure 3:
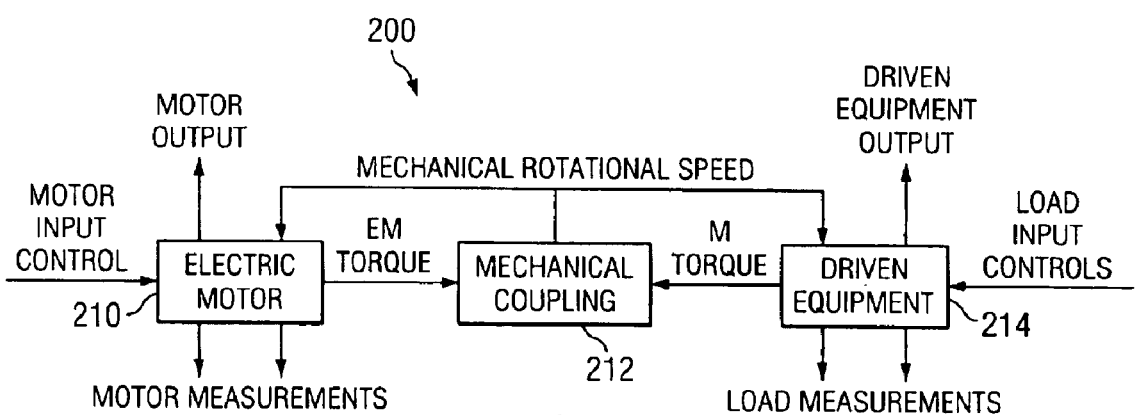
FIG. 3 is a block diagram illustrating one embodiment of a system that includes a first device that may be used to assess the condition and predict the life expectancy of a second device.

FIG. 3 is a block diagram illustrating one embodiment of a system 200 that includes a first device that may be used to assess the condition and predict the life expectancy of a second device. The first device may be mechanically or otherwise coupled to the second device.

According to the illustrated embodiment, system 200 includes an electric motor 210 coupled by a mechanical coupling 212 to motor driven equipment 214. According to one embodiment, system 10 may assess the condition and predict the life expectancy of electric motor 210 and assess the condition and predict the life expectancy of motor driven equipment 214. System 10 may receive signals representing measurements from electric motor 210, driven load 214, or both electric motor 210 and driven load 214. The motor measurements may include motor input representing voltage and motor output representing current. Motor measurements may also include condition indicators such as vibration, temperature, speed, other suitable indicator, or any combination of the preceding.

The condition assessment and predicted life expectancy of electric motor 210 may be analyzed in conjunction with signals comprising load measurements from driven equipment 214 in order to assess the condition and predict the life expectancy of driven equipment 214. Load measurements may include load input representing flow rate or other parameter and driven equipment output representing pressure or other parameter. Load measurements may also include other indicators such as vibration, temperature, speed, other suitable indicator, or any combination of the preceding.

Figure 4:
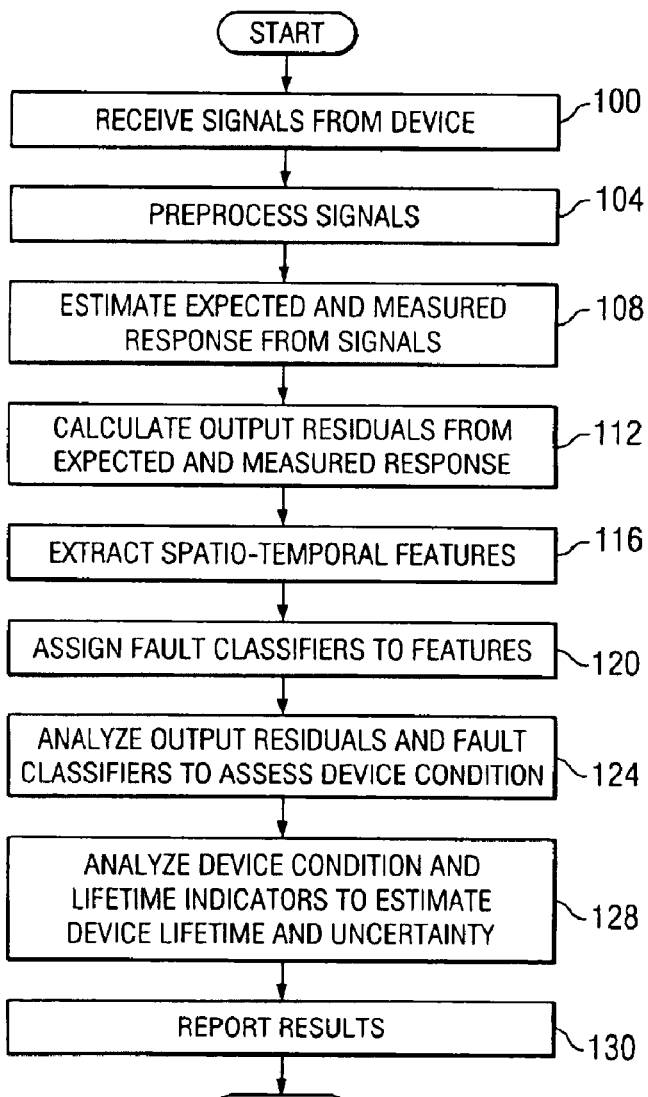
FIG. 4 is a flowchart illustrating one embodiment of a method for monitoring one or more devices.

FIG. 4 is a flowchart illustrating one embodiment of a method for monitoring device 20. The method may be used to assess the condition of device 20 and predict a life expectancy for device 20. The method begins at step 100, where system 10 receives signals from device 20 through interface 30. The signals may represent measured inputs into device 20 and measured outputs from device 20.

The signals are preprocessed at step 104. Preprocessing may include conditioning and then sampling the signals at measurement subsystem 40. The expected and measured responses may be estimated from the signals at step 108 by model-based subsystem 42. Model-based subsystem 42 may decouple the effect of the measured inputs on the measured outputs from the effect of a measured or estimated disturbance on the measured outputs. The output residuals are calculated from the expected and measured responses at step 112 by subtracting the expected response from the measured response. The output residuals may provide information about faults of device 20.

Spatial-temporal features are extracted at step 116 by signal-based subsystem 44. The features may represent faults of device 20. Fault classifiers are assigned to the features at step 120 by classification subsystem 46. Condition assessment subsystem 50 analyzes the output residuals from model-based subsystem 42 and the fault classification from classification subsystem 46 in order to assess the condition of device 20 at step 124.

Life expectancy prediction subsystem 52 analyzes the device condition and life expectancy indicators to estimate the device life expectancy and uncertainty of the device life expectancy at step 128. Interface subsystem 54 reports the results at step 130. The results may report the condition of device 20, the predicted life expectancy of device 20, the uncertainty of the predicted life expectancy, or other suitable information. After reporting the results, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that the condition of a device may be assessed. Assessing the condition of a device may reduce the probability of shutting down and performing maintenance on the device before the device requires servicing, and may reduce the probability of continuing to operate a device that requires servicing.

Although an embodiment of the invention and its advantages are described in detail, a person skilled in the art could make various alterations, additions, and omissions without departing from the spirit and scope of the present invention as defined by the appended claims.

What is claimed is:

1. A method for assessing the condition of a device, comprising:
   receiving a plurality of signals from a sensor operable to make one or more electrical measurements of a device;
   estimating an expected response of the device in accordance with the received signals by:
     estimating a disturbance from the received signals; and
     calculating the expected response in accordance with the disturbance;
   establishing a measured response of the device in accordance with the received signals;
   calculating an output residual according to the expected response and the measured response; and
   assessing the condition of the device by identifying a fault of the device in accordance with the output residual.

2. The method of claim 1, wherein the device comprises an electric device.

3. The method of claim 1, wherein the device comprises an electric motor.

4. The method of claim 1, further comprising monitoring the one or more electrical measurements of the device to generate the plurality of signals.

5. The method of claim 1, wherein:
   the received signals comprise one or more measured inputs to the device and one or more measured outputs from the device; and
   estimating the expected response of the device in accordance with the received signals further comprises:
     estimating a disturbance of the received signals;
     decoupling a first effect of the one or more measured inputs on the one or more measured outputs and a second effect of the disturbance on the one or more measured outputs; and
     estimating the expected response of the device according to the first effect and the second effect.

6. The method of claim 1, further comprising extracting a spatio-temporal feature from the output residual.

7. The method of claim 1, further comprising extracting a spatio-temporal feature from the one or more electrical measurements.

8. The method of claim 1, further comprising classifying the fault to assess the condition of the device.

9. The method of claim 1, further comprising:
   receiving an indicator corresponding to a life expectancy of the device; and
   estimating the life expectancy associated with the device in accordance with the condition of the device and the indicator.

10. The method of claim 1, further comprising:
    receiving an indicator corresponding to a life expectancy of the device;
    estimating the life expectancy associated with the device in accordance with the condition of the device and the indicator; and
    calculating an uncertainty associated with the estimated life expectancy.

11. A system for assessing the condition of a device, comprising:
    a sensor operable to make one or more electrical measurements of a device to generate a plurality of signals; and
    a processor coupled to the sensor and operable to:
      estimate an expected response of the device in accordance with the signals by:
        estimating a disturbance from the signals; and
        calculating the expected response in accordance with the disturbance;
      establish a measured response of the device in accordance with the signals;
      calculate an output residual according to the expected response and the measured response; and
      assess the condition of the device by identifying a fault of the device in accordance with the output residual.

12. The system of claim 11; wherein the device comprises an electric device.

13. The system of claim 11; wherein the device comprises an electric motor.

14. The system of claim 11 the sensor further operable to monitor the one or more electrical measurements of the device to generate the plurality of signals.

15. The system of claim 11, wherein:
    the signals comprise one or more measured inputs to the device and one or more measured outputs from the device; and
    the processor is operable to estimate the expected response of the device in accordance with the signals by:
      estimating a disturbance of the signals;
      decoupling a first effect of the one or more measured inputs on the one or more measured outputs and a second effect of the disturbance on the one or more measured outputs; and
      estimating the expected response of the device according to the first effect and the second effect.

16. The system of claim 11, the processor further operable to extract a spatio-temporal feature from the output residual.

17. The system of claim 11, the processor further operable to extract a spatio-temporal feature from the one or more electrical measurements.

18. The system of claim 11, the processor further operable to classify the fault to assess the condition of the device.

19. The system of claim 11, the processor further operable to:
    receive an indicator corresponding to a life expectancy of the device; and
    estimate the life expectancy associated with the device in accordance with the condition of the device and the indicator.

20. The system of claim 11, the processor further operable to:
    receive an indicator corresponding to a life expectancy of the device;
    estimate the life expectancy associated with the device in accordance with the condition of the device and the indicator; and calculate an uncertainty associated with the estimated life expectancy.

21. Computer-implemented logic for assessing the condition of a device, the logic embodied in a medium and operable to:
receive a plurality of signals from a sensor operable to make one or more electrical measurements of a device;
estimate an expected response of the device in accordance with the received signals by:
estimating a disturbance from the received signals; and
calculating the expected response in accordance with the disturbance;
establish a measured response of the device in accordance with the received signals;
calculate an output residual according to the expected response and the measured response; and
assess the condition of the device by identifying a fault of the device in accordance with the output residual.

22. The logic of claim 21, wherein the device comprises an electric device.

23. The logic of claim 21, wherein the device comprises an electric motor.

24. The logic of claim 21, further operable to monitor the one or more electrical measurements of the device to generate the plurality of signals.

25. The logic of claim 21, wherein:
the received signals comprise one or more measured inputs to the device and one or more measured outputs from the device; and
the logic further operable to estimate the expected response of the device in accordance with the received signals by:
estimating a disturbance of the received signals;
decoupling a first effect of the one or more measured inputs on the one or more measured outputs and a second effect of the disturbance on the one or more measured outputs; and
estimating the expected response of the device according to the first effect and the second effect.

26. The logic of claim 21, further operable to extract a spatio-temporal feature from the output residual.

27. The logic of claim 21, further operable to extract a spatio-temporal feature from the one or more electrical measurements.

28. The logic of claim 21, further operable to classify the fault to assess the condition of the device.

29. The logic of claim 21, further operable to:
receive an indicator corresponding to a life expectancy of the device; and
estimate the life expectancy associated with the device in accordance with the condition of the device and the indicator.

30. The logic of claim 21, further operable to:
receive an indicator corresponding to a life expectancy of the device;
estimate the life expectancy associated with the device in accordance with the condition of the device and the indicator; and
calculate an uncertainty associated with the estimated life expectancy.

31. A system for assessing the condition of a device, comprising:
means for receiving a plurality of signals from a sensor operable to make one or more electrical measurements of a device;
means for estimating an expected response of the device in accordance with the received signals by;
estimating a disturbance from the received signals; and
calculating the expected response in accordance with the disturbance;
means for establishing a measured response of the device in accordance with the received signals;
means for calculating an output residual according to the expected response and the measured response; and
means for assessing the condition of the device by identifying a fault of the device in accordance with the output residual.

32. A method for assessing the condition of a device, comprising:
monitoring at a sensor one or more electrical measurements of a device to generate a plurality of signals, the device comprising an electric device comprising an electric motor;
receiving the plurality of signals from the sensor, the received signals comprising one or more measured inputs to the device and one or more measured outputs from the device;
estimating an expected response of the device in accordance with the received signals by:
estimating a disturbance of the received signals;
decoupling a first effect of the one or more measured inputs on the one or more measured outputs and a second effect of the disturbance on the one or more measured outputs; and
estimating the expected response of the device according to the first effect and the second effect;
establishing a measured response of the device in accordance with the received signals;
calculating an output residual according to the expected response and the measured response;
assessing the condition of the device by identifying a fault of the device in accordance with the output residual by:
extracting a first spatio-temporal feature from the output residual; and
extracting a second spatio-temporal feature from the one or more measurements; and
classifying the fault to assess the condition of the device;
receiving an indicator corresponding to a life expectancy of the device;
estimating the life expectancy associated with the device in accordance with the condition of the device and the indicator; and
calculating an uncertainty associated with the estimated life expectancy.

33. The method of claim 1, wherein the device comprises a generator.

34. The method of claim 1, wherein the device comprises motor-driven equipment.

35. The system of claim 11, wherein the device comprises a generator.

36. The system of claim 11, wherein the device comprises motor-driven equipment.

37. The logic of claim 21, wherein the device comprises a generator.

38. The logic of claim 21, wherein the device comprises motor-driven equipment.

* * * * *